(12) United States Patent
Kopp

(10) Patent No.: US 8,948,547 B2
(45) Date of Patent: Feb. 3, 2015

(54) MULTI-STATE POLARIZATION PRESERVING OPTICAL FIBER

(75) Inventor: Victor Il'ich Kopp, Fair Lawn, NJ (US)

(73) Assignee: Chiral Photonics, Inc., Pine Brook, NJ (US)

( * ) Notice: Subject to any disclaimer, the term of this patent is extended or adjusted under 35 U.S.C. 154(b) by 562 days.

(21) Appl. No.: 13/354,674

(22) Filed: Jan. 20, 2012

(65) Prior Publication Data

US 2012/0189242 A1 Jul. 26, 2012

Related U.S. Application Data

(60) Provisional application No. 61/421,976, filed on Jan. 20, 2011.

(51) Int. Cl.
*G02B 6/27* (2006.01)
*G02B 6/024* (2006.01)

(52) U.S. Cl.
CPC .............. *G02B 6/274* (2013.01); *G02B 6/2773* (2013.01); *G02B 6/024* (2013.01)
USPC ........................................................... 385/11

(58) Field of Classification Search
None
See application file for complete search history.

(56) References Cited

U.S. PATENT DOCUMENTS

| | | | | | |
|---|---|---|---|---|---|
| 5,452,394 | A | * | 9/1995 | Huang | 385/123 |
| 6,233,371 | B1 | * | 5/2001 | Kim et al. | 385/11 |
| 7,095,911 | B2 | * | 8/2006 | Kopp et al. | 385/11 |
| 7,983,515 | B2 | * | 7/2011 | Zhang et al. | 385/11 |
| 2012/0189241 | A1 | * | 7/2012 | Kopp | 385/11 |

* cited by examiner

*Primary Examiner* — Sarah Hahm
(74) *Attorney, Agent, or Firm* — Edward Etkin, Esq.

(57) ABSTRACT

The inventive chiral polarization preserving optical fiber utilizes a structure composed of specially positioned and configured single mode (SM) and conventional polarization maintaining (PM) fiber elements along with at least two novel circular chiral fiber polarizers (each operable to convert linearly polarized light to circularly polarized light), to preserve any arbitrary polarization state of light signals transmitted therethrough without the limitations and drawbacks of other polarization maintaining solutions. In another inventive embodiment thereof, the inventive chiral polarization preserving optical fiber is configured as an arbitrary polarization state maintaining light signal splitter.

5 Claims, 1 Drawing Sheet

10

10

100

MULTI-STATE POLARIZATION PRESERVING OPTICAL FIBER

CROSS REFERENCE TO RELATED APPLICATIONS

The present patent application claims priority from the commonly assigned co-pending U.S. provisional patent application Ser. No. 61/421,976, entitled "MULTI-STATE POLARIZATION PRESERVING OPTICAL FIBER".

FIELD OF THE INVENTION

The present invention relates generally to polarizers and polarization maintaining devices, and more particularly to a chiral polarization preserving optical fiber operable to preserve the state of any arbitrary polarization for light signals transmitted therethrough.

BACKGROUND OF THE INVENTION

Any device that requires polarized light uses one or more polarizers. Polarizers have many industrial applications. For example, polarizers may be utilized in electro-optical modulators and laser subsystems. In essence, a polarizer eliminates an undesirable light component of a first polarization, and allows a desirable light component of a second polarization to pass through. In numerous applications involving the use of polarizers, there is a great need to provide optical fiber components that are capable of maintaining/preserving a specific polarization state for light signals transmitted therethrough, over varying distances (from short couplers, to mid-/long-length optical fiber links).

However, conventional polarization maintaining/preservation solutions suffer from a number of disadvantages:
  Conventional polarization-maintaining (PM) fibers comprise two possible axis of polarized light propagation—slow and fast, and, most importantly, PM fibers can maintain linear polarized light ONLY along one of slow OR fast axis. If the polarization of the light signal is not linear, or is otherwise not aligned with one of these axis, the PM fiber will not maintain the polarization thereof. Furthermore, environmental changes may affect the PM fiber by changing the orientation of linear polarized light transmitted therethrough at output.
  A single mode (SM) fiber can maintain arbitrary polarization, but only if for very short lengths, and only when not subject to any physical or environmental stress.
  A spun fiber (e.g., a twisted fiber with a long pitch) which are typically designed to maintain arbitrary polarization, also have a number of drawbacks: they are limited in length, they must remain unstressed, and must be kept straight.

Accordingly, it would be very desirable to provide a polarization preserving optical fiber that is operable to preserve the state of any arbitrary polarization for light signals transmitted therethrough without limitations on the type of permitted states of polarization, on the fiber length, and with greatly reduced vulnerability to negative impact of environmental changes.

SUMMARY OF THE INVENTION

The multi-state chiral polarization preserving optical fiber of the present invention utilizes a structure composed of specially positioned and configured single mode (SM) and conventional polarization maintaining (PM) fiber elements along with at least two novel circular chiral fiber polarizers (each operable to convert linearly polarized light to circularly polarized light), to preserve any arbitrary polarization state of light signals transmitted therethrough without the limitations and drawbacks of other polarization maintaining solutions.

In another inventive embodiment thereof, the inventive chiral polarization preserving optical fiber is configured as an arbitrary polarization state maintaining light signal splitter.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE INVENTION

The system and method of the present invention advantageously overcome and address the drawbacks of previously known fiber-based polarization preserving/maintaining devices, and provide additional beneficial features. In summary, the inventive chiral polarization preserving optical fiber utilizes a structure composed of specially positioned and configured single mode (SM) and conventional polarization maintaining (PM) fiber elements, along with at least two novel circular chiral fiber polarizers (each operable to convert linearly polarized light to circularly polarized light), to preserve any arbitrary polarization state of light signals transmitted therethrough, without the limitations and drawbacks of other polarization preserving/maintaining solutions. In another inventive embodiment thereof, the inventive chiral polarization preserving optical fiber is configured as an arbitrary polarization state maintaining light signal splitter. Each of the above-noted chiral fiber circular polarizers may be the circular polarizers disclosed in the co-pending commonly assigned U.S. patent application entitled "CHIRAL FIBER CIRCULAR POLARIZER" of Kopp et al., that is hereby incorporated by reference herein in its entirety.

Figure 1:
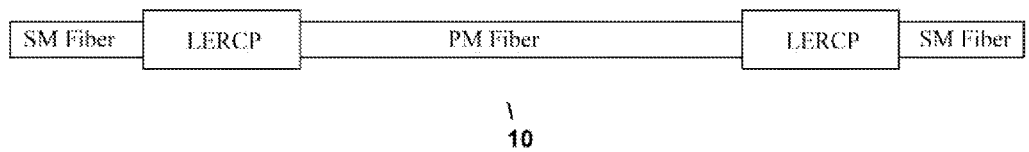
FIG. 1 is a schematic diagram of a side view of a first exemplary embodiment of the inventive multi-state polarization preserving optical fiber of the present invention.

Referring now to FIG. 1, an exemplary embodiment of the inventive multi-state polarization preserving (MSPP) optical fiber is shown as a MSPP fiber 10. In at least one exemplary embodiment thereof, the MSPP fiber 10 comprises a first chiral fiber circular polarizer section having a first single mode (SM) end and a first polarization maintaining (PM) end, a sequentially positioned linear-polarization maintaining optical fiber (PMF) section, having a first PMF end, connected to the first PM end through a first connection, and a second PMF end, and also includes a sequentially positioned second chiral fiber circular polarizer section having a second SM end and a second PM end connected to the second PMF end through a second connection, where the first PM end comprises a first PM end fast axis and a first PM end slow axis, where the first PMF end comprises a first PMF end fast axis, and a first PMF end slow axis, where the second PMF end comprises a second PMF end fast axis and a second PMF end slow axis, and where each of the first and second chiral fiber circular polarizers are configured to achieve a minimum extinction ratio. In accordance with the present invention, the first connection should be configured such that the first PM end fast axis is aligned with one of: the first PMF end fast axis, or the first PMF slow axis, while the second connection should be configured such that the second PM end fast axis is aligned with one of: the second PMF end fast axis, or the second PMF slow axis.

In another embodiment thereof, the MSPP fiber 10 may be configured such that the PMF section thereof comprises a first segment having the first PMF end, a first segment end, a first segment end slow axis, and a first segment end fast axis, and a sequentially positioned second segment having the second PMF end, a second segment end slow axis, and a second segment end fast axis. In exemplary alternate embodiments thereof, the first segment end may be connected to the second segment end, such that the first segment end slow axis is aligned with the second segment end fast axis, with the first segment and the second segment selected and configured to be of substantially the same length, and with the first and the second connections configured such that the first PM end fast axis is aligned with the first PMF end fast axis, while the second PM end fast axis is aligned with the second PMF end fast axis.

It should be noted that for PM devices, a change in the wavelength of input light will change polarization orientation at output. In accordance with the present invention, the MSPP fiber 10 may be readily modified to address this issue, for example by cutting the PM fiber section in the middle, and then rotating the sections by 90 degrees relative to one another, thus changing the transmitted light from a slow axis to a fast axis and vice versa, such that both components will arrive at the fiber end at same time, thus eliminating the wavelength dependence of the MSPP fiber 10.

Figure 2:
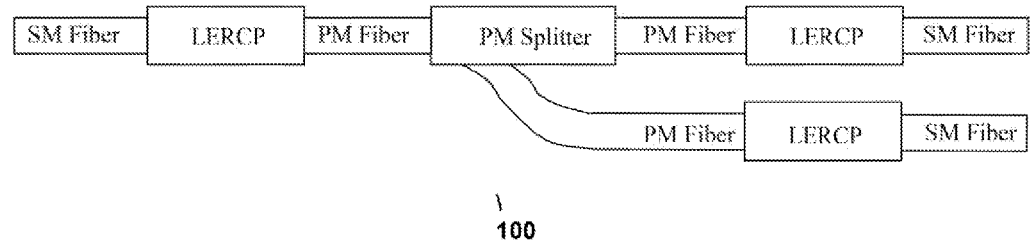
FIG. 2 is a schematic diagram of a side view of a second exemplary embodiment of the inventive multi-state polarization preserving optical fiber of the present invention.

Referring now to FIG. 2, in a different exemplary embodiment thereof, the MSPP fiber 10 may be configured as an multi-state polarization preserving splitter, shown as MSPP splitter 100. The MSPP splitter 100 is essentially configured as the MSPP fiber 10 supplied with an input, a first output, a second output, a second PMF section having a third PMF end and a fourth PMF end, and a third chiral fiber circular polarizer section having a third SM end and a third PM end, where the third PMF end comprises a third PMF end fast axis, and a third PMF end slow axis, where the fourth PMF end comprises a fourth PMF end fast axis and a fourth PMF end slow axis, and where the first segment end is connected to the input through a third connection, the first output is connected to second segment end through a fourth connection, the second output is connected to the third PMF end through a fifth connection, and the fourth PMF end is connected to the third PM end through a sixth connection. Preferably, the third chiral fiber circular polarizer section of the MSPP splitter 100 is configured to achieve a minimum extinction ratio, with at least one of the third, fourth, fifth and sixths connections being configured such that the third PM end fast axis is aligned with one of: the fourth PMF end fast axis or the fourth PMF slow axis.

In an alternate exemplary embodiment of the MSPP splitter 100, the input comprises an input fast axis and an input slow axis, the first output comprises a first output fast axis and a first output slow axis, the second output comprises a second output fast axis and a second output slow axis, where at least one of the third, fourth, fifth and sixths connections is configured such that the first PM end fast axis is aligned with the first PMF end fast axis, the first segment end fast axis is aligned with the input fast axis, the first output fast axis is aligned with the second segment end slow axis, the second output fast axis is aligned with the third PMF end slow axis, the second PM end fast axis is aligned with the second PMF end fast axis, the third PM end fast axis is aligned with the fourth PMF end fast axis, and where the second segment length and the second PMF section are selected and configured to substantially compensate for a phase shift between the fast and slow axis.

It should be noted for all embodiments thereof, that the inventive MSPP splitter 100 may be readily configured to operate at various splitting ratios as a matter of design choice.

Thus, while there have been shown and described and pointed out fundamental novel features of the inventive apparatus as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A polarization maintaining optical fiber link comprising:
a first chiral fiber circular polarizer section having a first single mode (SM) end and a first polarization maintaining (PM) end;
a sequentially positioned linear-polarization maintaining optical fiber (PMF) section, having a first PMF end, connected to said first PM end through a first connection, and a second PMF end; and
a sequentially positioned second chiral fiber circular polarizer section having a second SM end and a second PM end connected to said second PMF end through a second connection, wherein said first PM end comprises a first PM end fast axis and a first PM end slow axis, wherein said first PMF end comprises a first PMF end fast axis, and a first PMF end slow axis, wherein said second PMF end comprises a second PMF end fast axis and a second PMF end slow axis, and wherein:
each of said first and second chiral fiber circular polarizers are configured to achieve a minimum extinction ratio,
said first connection is configured such that said first PM end fast axis is aligned with one of: said first PMF end fast axis or said first PMF slow axis, and
said second connection is configured such that said second PM end fast axis is aligned with one of: said second PMF end fast axis or said second PMF slow axis.

2. The polarization maintaining optical fiber link of claim 1, wherein said PMF section comprises a first segment having said first PMF end, a first segment end, a first segment end slow axis, and a first segment end fast axis, and a sequentially positioned second segment having said second PMF end, a second segment end slow axis, and a second segment end fast axis.

3. The polarization maintaining optical fiber link of claim 2, wherein said first segment end is connected to said second segment end such that said first segment end slow axis is aligned with said second segment end fast axis; wherein said first segment and said second segment are of substantially the same length, and wherein said first and said second connections are configured such that said first PM end fast axis is aligned with said first PMF end fast axis, while said second PM end fast axis is aligned with said second PMF end fast axis.

4. The polarization maintaining optical fiber link of claim 2, further comprising a polarization-insensitive polarization-preserving fiber splitter having an input, a first output, a second output, a second PMF section having a third PMF end and a fourth PMF end, and a third chiral fiber circular polarizer section having a third SM end and a third PM end, wherein said third PMF end comprises a third PMF end fast axis and a third PMF end slow axis, wherein said fourth PMF end comprises a fourth PMF end fast axis and a fourth PMF end slow axis, and wherein said first segment end is connected to said input through a third connection, said first output is connected to second segment end through a fourth connection, said second output is connected to said third PMF end through a fifth connection, and said fourth PMF end is connected to said third PM end through a sixth connection, and wherein said third chiral fiber circular polarizer section is configured to achieve a minimum extinction ratio, and wherein at least one of said third, fourth, fifth and sixths connections is configured such that said third PM end fast axis is aligned with one of: said fourth PMF end fast axis or said fourth PMF slow axis.

5. The polarization maintaining optical fiber link of claim 4, wherein said input comprises an input fast axis and an input slow axis, said first output comprises a first output fast axis and a first output slow axis, said second output comprises a second output fast axis and a second output slow axis, wherein at least one of said third, fourth, fifth and sixths connections is configured such that said first PM end fast axis is aligned with said first PMF end fast axis, said first segment end fast axis is aligned with said input fast axis, said first output fast axis is aligned with said second segment end slow axis, said second output fast axis is aligned with said third PMF end slow axis, said second PM end fast axis is aligned with said second PMF end fast axis, said third PM end fast axis is aligned with said fourth PMF end fast axis, and wherein said second segment length and said second PMF section are selected and configured to substantially compensate for a phase shift between said fast and slow axis.

* * * * *